(12) United States Patent  
Moore (10) Patent No.: US 8,655,647 B2  
(45) Date of Patent: Feb. 18, 2014

(54) N-GRAM SELECTION FOR PRACTICAL-SIZED LANGUAGE MODELS

(75) Inventor: Robert Carter Moore, Mercer Island, WA (US)

(73) Assignee: Microsoft Corporation, Redmond, WA (US)

(*) Notice: Subject to any disclaimer, the term of this patent is extended or adjusted under 35 U.S.C. 154(b) by 797 days.

(21) Appl. No.: 12/722,522

(22) Filed: Mar. 11, 2010

(65) Prior Publication Data

US 2011/0224971 A1  Sep. 15, 2011

(51) Int. Cl.
| | |
|---|---|
| G06F 17/27 | (2006.01) |
| G06F 17/20 | (2006.01) |
| G06F 17/28 | (2006.01) |
| G06F 17/21 | (2006.01) |
| G10L 15/26 | (2006.01) |
| G10L 15/00 | (2013.01) |
| G10L 17/00 | (2013.01) |
| G10L 15/28 | (2013.01) |
| G10L 15/04 | (2013.01) |

(52) U.S. Cl.
USPC .............. 704/9; 704/1; 704/2; 704/4; 704/10; 704/235; 704/240; 704/243; 704/246; 704/255; 704/257; 704/251

(58) Field of Classification Search
USPC .............. 704/1, 2, 9, 10, 240, 243, 255, 257, 704/251, 4, 235, 246
See application file for complete search history.

(56) References Cited

U.S. PATENT DOCUMENTS

| | | | | |
|---|---|---|---|---|
| 5,267,345 | A | * | 11/1993 | Brown et al. ................ 704/255 |
| 6,314,399 | B1 | * | 11/2001 | Deligne et al. ............... 704/257 |
| 7,031,908 | B1 | | 4/2006 | Huang et al. |
| 7,418,386 | B2 | | 8/2008 | Lai et al. |
| 7,565,372 | B2 | * | 7/2009 | Zhang et al. ........................ 1/1 |

(Continued)

FOREIGN PATENT DOCUMENTS

WO  0148737 A2  7/2001

OTHER PUBLICATIONS

Robert C. Moore and Chris Quirk. 2009. Less is more: significance-based n-gram selection for smaller, better language models. In Proceedings of the 2009 Conference on Empirical Methods in Natural Language Processing: vol. 2-vol. 2, EMNLP '09, pp. 746-755, Stroudsburg, PA, USA. Association for Computational Linguistics.*

(Continued)

*Primary Examiner* — Edgar Guerra-Erazo
(74) *Attorney, Agent, or Firm* — Steve Wight; Carole Boelitz; Micky Minhas (57) ABSTRACT

Described is a technology by which a statistical N-gram (e.g., language) model is trained using an N-gram selection technique that helps reduce the size of the final N-gram model. During training, a higher-order probability estimate for an N-gram is only added to the model when the training data justifies adding the estimate. To this end, if a backoff probability estimate is within a maximum likelihood set determined by that N-gram and the N-gram's associated context, or is between the higher-order estimate and the maximum likelihood set, then the higher-order estimate is not included in the model. The backoff probability estimate may be determined via an iterative process such that the backoff probability estimate is based on the final model rather than any lower-order model. Also described is additional pruning referred to as modified weighted difference pruning.

20 Claims, 5 Drawing Sheets

(56) References Cited

U.S. PATENT DOCUMENTS

| | | | |
|---|---|---|---|
| 7,877,258 B1* | 1/2011 | Chelba et al. | 704/257 |
| 8,332,207 B2* | 12/2012 | Brants et al. | 704/9 |
| 2004/0138883 A1* | 7/2004 | Ramakrishnan et al. | 704/236 |
| 2004/0138884 A1* | 7/2004 | Whittaker et al. | 704/236 |
| 2004/0181410 A1* | 9/2004 | Hwang | 704/256 |
| 2004/0220809 A1* | 11/2004 | Wang et al. | 704/257 |
| 2005/0055199 A1* | 3/2005 | Ryzchachkin et al. | 704/4 |
| 2005/0216265 A1* | 9/2005 | Chelba et al. | 704/240 |
| 2006/0053015 A1* | 3/2006 | Lai et al. | 704/257 |
| 2007/0078653 A1* | 4/2007 | Olsen | 704/240 |
| 2008/0082485 A1* | 4/2008 | Church et al. | 707/3 |
| 2009/0099841 A1 | 4/2009 | Chen | |
| 2010/0217596 A1* | 8/2010 | Morris et al. | 704/251 |
| 2011/0224983 A1* | 9/2011 | Moore | 704/240 |

OTHER PUBLICATIONS

Moore, Robert C., and Chris Quirk. 2009. Improved smoothing for N-gram language models based on ordinary counts. In Proceedings of ACL-IJCNLP 2009.*

Kneser, R.; Ney, H., "Improved backing-off for M-gram language modeling," Acoustics, Speech, and Signal Processing, 1995. ICASSP-95., 1995 International Conference on , vol. 1, No., pp. 181,184 vol. 1, May 9-12, 1995.*

Crespo, et al., "Language Model Adaptation for Conversational Speech Recognition using Automatically Tagged Pseudo-Morphological Classes", Retrieved at <<http://ieeexplore.ieee.org/stamp/stamp.jsp?arnumber=00596058>>, Proceedings of the 1997 IEEE International Conference on Acoustics, Speech, and Signal Processing (ICASSP '97)—vol. 2, Jul. 6, 2009, p. 823-826.

Eng, et al., "Radiology Report Entry with Automatic Phrase Completion Driven by Language Modeling", Retrieved at <<http://radiographics.rsnajnls.org/cgi/reprint/24/5/1493.pdf>> Sep.-Oct. 2004, Vo.24, No. 5, pp. 1494-1501.

Yuret, Deniz, "Smoothing a Tera-Word Language Model", Retrieved at <<http://www.aclweb.org/anthology/P/P08/P08-2036.pdf>> In the proceedings of ACL-08: HLT, Short Papers (Companion Volume), pp. 141-144.

Gao, et al., "Improving Language Model Size Reduction using Better Pruning Criteria", Retrieved at <<http://research.microsoft.com/en-us/um/people/jfgao/paper/prunelm-acl02.camera.pdf>> In the proceedings of the 40th Annual Meeting on Association for Computational Linguistics, 2002, pp. 176-182.

"ngram-Discount", Retrieved at <<http://www.speech.sri.com/projects/srilm/manpages/ngram-discount.7.html>>, retrieved date Jul. 7, 2009, pp. 8.

Brants, et al., "Large Language Models in Machine Translation", Retrieved at <<http://acl.ldc.upenn.edu/D/D07/D07-1090.pdf>> In the Proceedings of the Joint Conference on Empirical Methods in Natural Language Processing and Computational Natural Language Learning, Jun. 2007, pp. 858-867.

Chen, et al., "An Empirical Study of Smoothing Techniques for Languages Modeling", Retrieved at <<http://research.microsoft.com/en-us/um/people/joshuago/tr-10-98.pdf>>, Jul. 24, 1998, pp. 1-63.

Goodman, et al., "Language Model Size Reduction by Pruning and Clustering", Retrieved at <<http://research.microsoft.com/en-us/um/people/joshuago/icslp-really-final.ps>> pp. 5.

Jedynak, et al., "Maximum Likelihood Set for Estimating a Probability Mass Function", Retrieved at <<http://www.clsp.jhu.edu/~sanjeev/Pubs/NC2005.pdf>> Neural Computation 17, 2005 pp. 1-23.

Koehn, "Manual and Automatic Evaluation of Machine Translation between European Languages", Retrieved at <<http://www.mt-archive.info/HLT-NAACL-2006-Koehn.pdf>> In the proceedings of the Workshop on Statistical Machine Translation, 2006, pp. 102-121.

Ron, et al., "The Power of Amnesia: Learning Probabilistic Automata with Variable Memory Length", Retrieved at <<http://www.cs.huji.ac.il/~singer/papers/psa.ps.gz>> 1996, p. 1-34.

Rosenfeld, et al., "Improvements in Stochastic Language Modeling", Retrieved at <<http://portal.acm.org/citation.cfm?id=1075552&dl=&coll=>> Proceedings of the workshop on Speech and Natural Language, 1992, pp. 107-111.

Seymore, et al., "Scalable Trigram Backoff Language Models", Retrieved at <<http://www.cs.cmu.edu/~roni/papers/scalable-TR-96-139.pdf>> May 1996, pp. 20.

Stolcke, Andreas, "Entropy-Based Pruning of Backoff Language Models", Retrieved at <<http://citeseerx.ist.psu.edu/viewdoc/download;jsessionid=642B18A57D66F061A880BB21155B759C?doi=10.1.1.56.8924&rep=rep1&type=pdf>> 1998, pp. 270-274.

"Estimation, Evaluations and Hold Outs", Retrieved at <21 http://www.cs.rochester.edu/u/james/CSC248/Lec4.pdf>>, Retrieved Date: Jul. 6, 2009, pp. 1-7.

Ney, et al., "On Structuring Probabilistic Dependences in Stochastic Language Modelling", Retrieved at <<http://ac.els-cdn.com/S0885230884710011/1-s2.0-S0885230884710011-main.pdf?_tid=4189aa04-2086-11e3-a849-00000aacb361&acdnat=1379524855_9d5e19d1653770eb886c5baee5452e34>>, Computer Speech and Language, 1994, vol. 8, pp. 1-38.

* cited by examiner

N-GRAM SELECTION FOR PRACTICAL-SIZED LANGUAGE MODELS

BACKGROUND

Statistical language models (SLMs) estimate the probability of a text string as a string of natural language, and thus may be used with applications that output natural language text. For example, systems such as speech recognizers or machine translation systems generate alternative text outputs, and those outputs may be processed by statistical language models to compute probability values indicating which of them are the most natural.

In general, N-gram language models estimate the probability of a particular word in a given context of n−1 preceding words. In a typical implementation, the probability is based upon the number of times the word appeared in that context in a training corpus, the number of times the n−1 word context appears in the training corpus, and on an estimate of the probability of the word, given a shorter context of n−2 preceding words. Because the model has to handle words that do not appear in a given context anywhere in the training data, smoothing is performed, which in general reduces the probabilities of words observed in a particular context so as to reserve some probability mass to assign to words that have not been observed in that context. Generally, the estimate of the probability of a word given the shorter context is multiplied by a constant, called the backoff weight, that depends on the longer context. The backoff weight is used so that the probabilities for all words, given the longer context, sum to 1.0 to create a valid conditional probability distribution.

The more natural and human-like the piece of text is, the higher the probability that the statistical language model should assign to it. One way that the quality of a language model is measured is to evaluate the probabilities that the language model assigns to human-generated text compared to those it assigns to mechanically or randomly-generated text. One standard metric used to measure the probability assigned to a text string by a statistical language model is perplexity. The perplexity of a text string according to a language model is a positive real number that is closer to zero, the more likely the string is according to the model. Thus, a good language model will assign a lower perplexity to human-generated text than it assigns to mechanically or randomly-generated text.

Another factor in evaluating statistical language models is their size. When training language models, higher and higher order N-Gram models (at present sometimes ranging from 5-grams to 7-grams), along with larger and larger corpora are being used, because doing so tends to increase their quality (i.e., result in lower perplexity for human-generated text). In general, training proceeds by building a lower order model and then using that lower order model to smooth the next higher order model, and so on, until the final N-gram model is built.

However, higher order N-Gram training tends to result in language models that are so large that they are impractical and/or inconvenient to use in many scenarios. For example, when a statistical language model cannot be stored in the memory of a single server, complex and inefficient distributed storage schemes need to be used.

There are known pruning techniques that can reduce the size of the model, but only at the expense of significantly reducing its quality. What is desirable is a way to provide a reduced-size statistical language model that does not significantly reduce (and even can improve) the quality of the statistical language model relative to an un-pruned language model.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which an N-gram model is trained using an N-gram selection technique that includes only those N-grams that meet one or more selection criteria, thereby controlling the size of the final N-gram model. During training, if a backoff probability estimate is within a maximum likelihood set determined by that N-gram and the N-gram's associated context, then a higher-order probability estimate for the N-gram is not included in the model. The backoff probability estimates may be determined via an iterative process such that decision of which higher-order estimates to include in the final model is based on the final backoff probability estimates rather than any other backoff probability estimates.

In one aspect, if the backoff probability estimate is not within the maximum likelihood set, another criterion is evaluated as to whether the backoff probability estimate lies between the maximum likelihood set and the higher-order probability estimate. If so, the higher-order probability estimate is excluded from the model.

In another aspect, if an N-gram has not been observed in the training data, whether a higher-order probability estimate for that N-gram is included in the model depends on the value of the backoff probability estimate for that N-gram with respect to a limit determined by the maximum likelihood set for the N-gram. If the limit is exceeded, a higher-order probability estimate is included in the model, capped based upon the limit, e.g., set equal to the limit.

In another aspect, additional pruning may be performed. One type of additional pruning is modified weighted difference pruning, which uses an estimate of the probability of an N-gram computed by chaining explicit probability estimates for N-gram lengths, an absolute value of a difference of log probabilities, and/or the difference in log probability with respect to a final backoff weight for the model.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards training N-gram language models via a technology referred to as significance-based N-gram selection, which not only reduces model size by considerably reducing the number of parameters in higher-order models, but also improves perplexity (relative to both other size-reduction techniques and to un-pruned models) when used with various smoothing methods. Also described is a modified weighted-difference pruning technique, which, when combined with significance-based N-gram selection, produces highly desirable models.

In general and as described below, N-gram selection is performed while training the model with higher and higher-order estimates, and operates to exclude an explicit higher-order estimate of the probability of a particular word in a particular context from the model whenever the distribution of observations for the higher-order estimate provides no evidence that the higher-order estimate is better than the backoff estimate. Modified weighted-difference pruning further reduces the model size, as also described below.

It should be understood that any of the examples described herein are non-limiting examples. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in computing language models in general.

Figure 1:
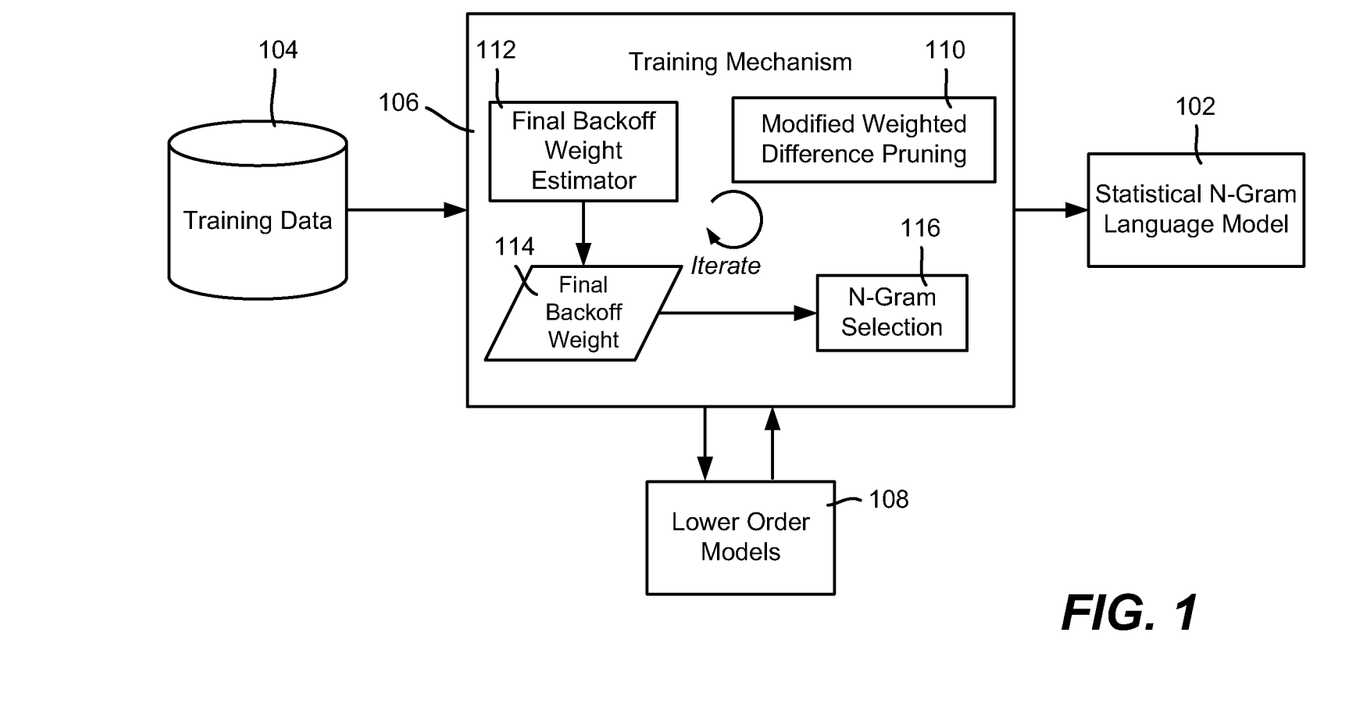
FIG. 1 is a block diagram showing example components for training a statistical N-gram model using N-Gram selection and/or modified weighted difference pruning to control the size of an N-gram model.

FIG. 1 shows a system for training an N-gram language model 102 based upon training data 104. As is typical, a training mechanism 106 builds lower-order models based upon N-gram counts in the training data 104 for lower values of N, and then uses those lower-order models to train a model for the next higher value of N, and so on, until the final higher-order N-gram model is obtained.

However, unlike previous training mechanisms, the technology described herein incorporates a criterion described below to decide which words are to have their probability estimated in a given context, based only on their backoff probability. This criterion considers the probability of seeing the number of occurrences of a word in the longer context, which were observed in the training corpus, given the backoff probability estimate for the word. If seeing that number of occurrences is sufficiently probable according to the backoff probability for the word, then only the backoff probability for the word is used in that particular longer context. In other words, a higher-order estimate does not include an explicit higher-order estimate unless the training data justifies doing so, as described below.

A second criterion for selecting which words are to have their probability estimated in a given context based only on their backoff probability comprises a modified form of what is referred to as weighted difference pruning. One modified weighted difference pruning method is described below. These two criteria may be applied together, or separately.

These aspects, described below, are represented in the training mechanism 106 of FIG. 1, which includes a modified weighted difference pruning mechanism 110, and an iterative final backoff weight estimator mechanism 112 that computes a final backoff weight 114. An N-Gram selection mechanism 116 uses the final backoff weight 114 to determine whether to include a higher-order estimated probability in the model for a given N-gram.

Turning to additional details, a maximum likelihood estimate (MLE) N-gram model determines the probability of a word from the words that precede it in a given context, as the ratio of the number of occurrences of that word in that context in a training corpus to the total number of occurrences of any word in the same context. Thus, given a set of y observations of the context, the observed counts will have the highest probability of any possible set of y observations according to the MLE model derived from the relative frequencies of those observations. In general, however, the MLE model will not be the only model for which this set of observations is the most probable set of y observations. Instead, there is a set of such models, referred to as the maximum likelihood set (MLS) for the observations.

The observations alone are insufficient to make a reliable choice of the best probability estimate among the members of the MLS. The MLE may assign the observations a higher probability than other members of the MLS do, but that is merely an accident of what outcomes are possible given the number of observations.

The MLS is a probability range that is determined by considering the mode x of a probability distribution for the number of occurrences of an n-gram in y occurrences of its n−1-gram context, if the probability of the n-gram occurring given the context is p. The relationship between x and p is well-known to be given by the formula $x/(y+1) \leq p \leq (x+1)/(y+1)$. This defines the maximum likelihood set (MLS) for $p(w_n|w_1 \ldots w_{n-1})$ based on x occurrences of the n-gram $w_1 \ldots w_n$ and y occurrences of the context $w_1 \ldots w_{n-1}$.

With respect to N-gram selection, for each word $w_n$ in a context $w_1 \ldots w_{n-1}$ with a backoff estimate for the probability of that word in that context $\beta p(w_n|w_2 \ldots w_{n-1})$, an explicit estimate of $p(w_n|w_1 \ldots w_{n-1})$ is not included in the model if the backoff estimate is within the MLS of the counts for $w_1 \ldots w_n$ and $w_1 \ldots w_{n-1}$. Note that $p(w_n|w_2 \ldots w_{n-1})$ is the next lower-order estimate, and $\beta$ is the backoff weight for the context $w_1 \ldots w_{n-1}$. An iterative way to determine the backoff weight is described below.

N-gram selection needs to find the MLS of a set of observations only for binomial distributions (rather than general multinomial distributions), which has a straightforward solution:

$$MLS(x, y) = \left\{ p \,\middle|\, \frac{x}{y+1} \leq p \leq \frac{x+1}{y+1} \right\}$$

N-gram selection is thus "significance-based" because it considers the criterion as a significance test in which the backoff probability estimate is taken as the null hypothesis for the estimate in the higher-order model, with the rejection threshold set to the lowest possible value. The null hypothesis (the backoff probability) is rejected when there are any outcomes for the given number of trials that are more likely, according to the null hypothesis, than the one observed.

To further refine the model, an explicit higher-order estimate is not added to the model if the next lower-order estimate is not explicitly stored in the model. In other words, once the probability estimate for a certain word in a shorter context has already been pruned, then no probability estimate for that word in any extension to that context is included in the model. This means that only the immediately next lower-order model need be kept available while performing N-gram selection.

Note that a number of methods for reducing the size of N-gram language models do so by comparing what the estimated probability for a word would be, given the number of times it occurs in the longer context, and the probability it would be assigned using the weighted probability given a shorter context (the "backoff probability"). After deciding which words probabilities are to be assigned to using only their backoff probability, the backoff weight needs to be recomputed to restore the property that all probabilities for words in the longer context sum to 1.0. This means that the decision as to which words to estimate the probability for, using only the backoff probability, is made using a backoff weight that differs from the backoff weight used in the final language model. As a result, words that are chosen using the non-final backoff weight may no longer satisfy the decision criterion using the recomputed backoff weight. This results in a less than optimal final language model.

As will be understood, in contrast to such other techniques, one implementation described herein makes such decisions according to a criterion using the final backoff weight. This has a practical complication in that to decide which N-grams for each context to explicitly include in the higher-order model, the backoff weight for the context needs to be known; however the backoff weight cannot be computed until it is known which higher-order N-grams are included in the model.

Figure 2:
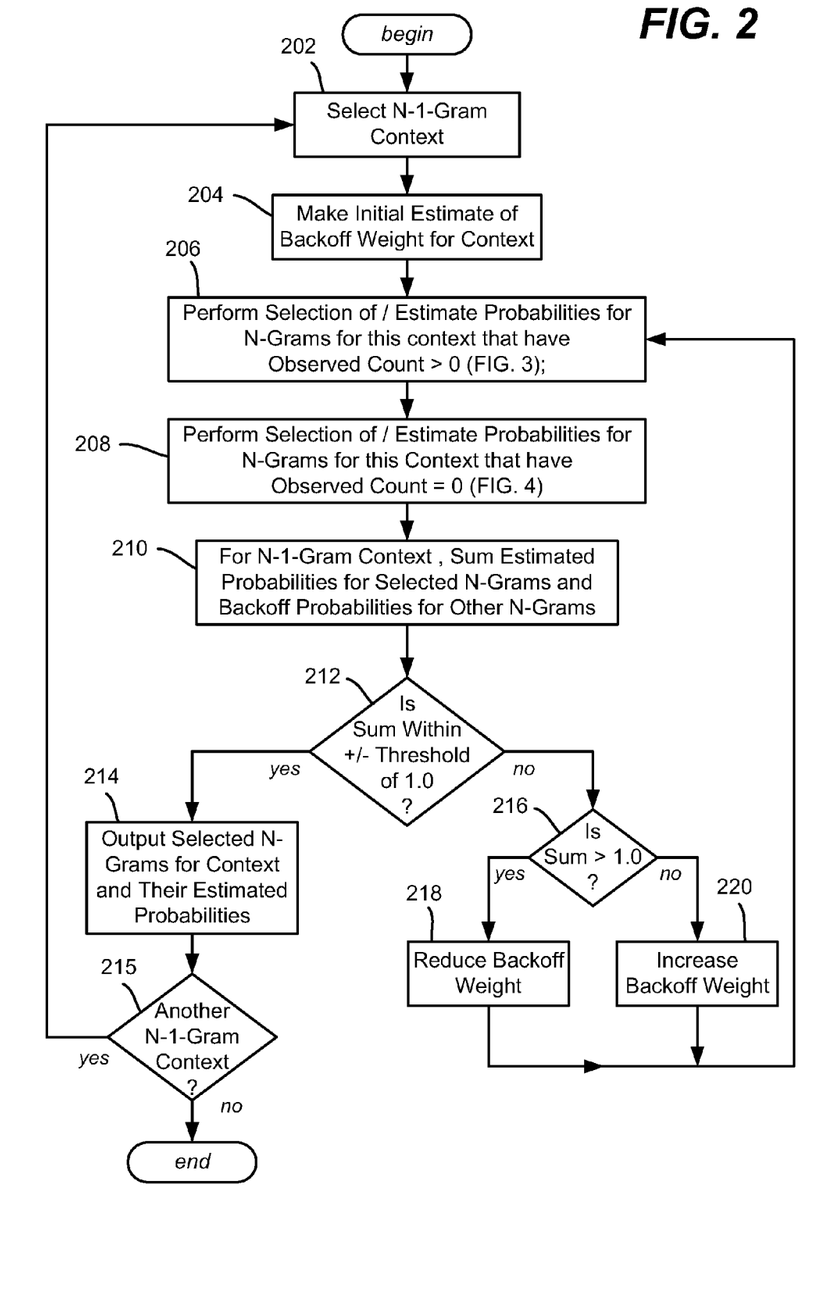
FIG. 2 is a flow diagram showing example steps that may be taken in an N-gram selection process, including example steps that may be taken in an iterative process to determine a final backoff weight for use by the N-gram selection process.
Figure 3:
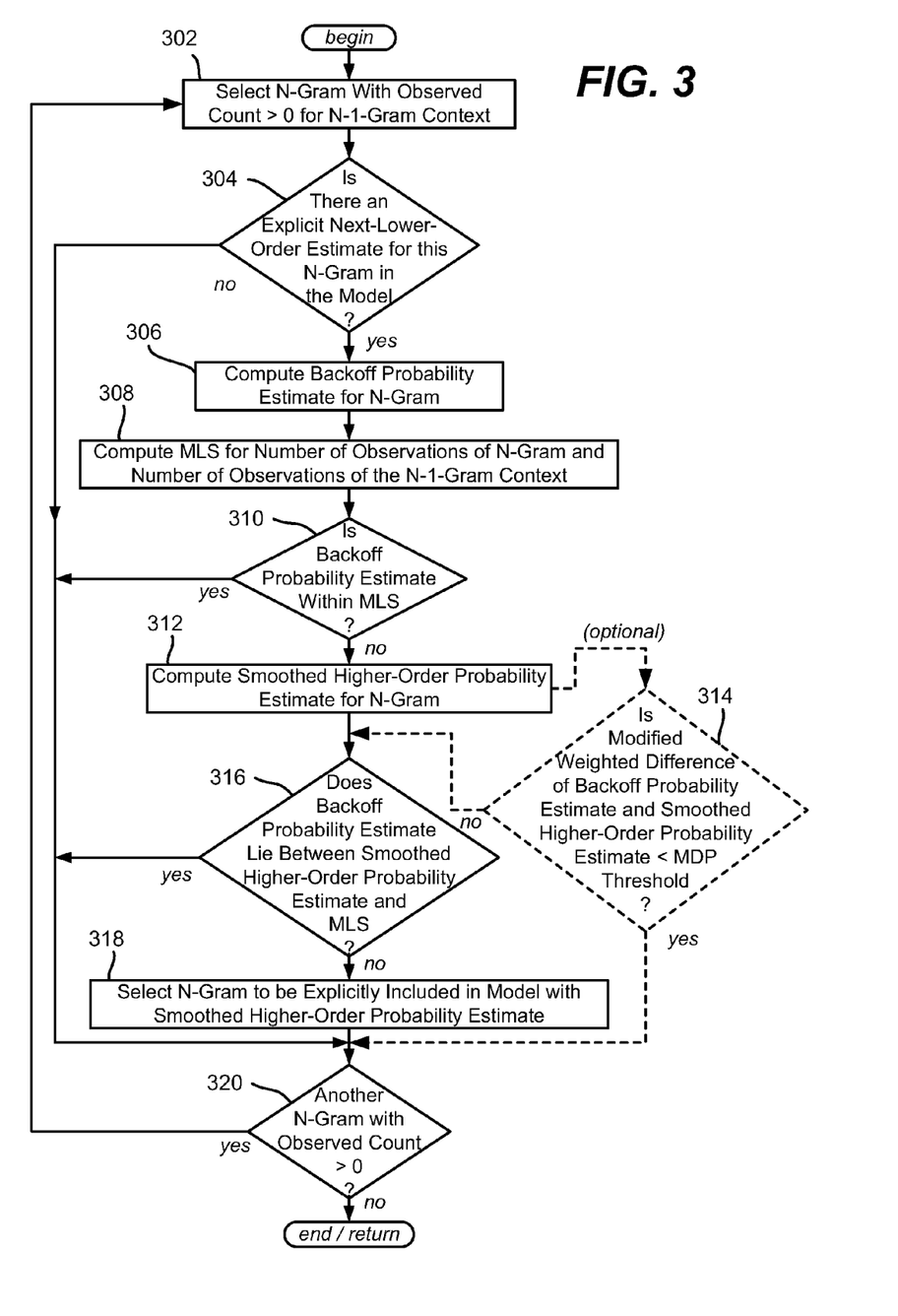
FIG. 3 is a flow diagram showing example steps that may be taken to decide whether to include an explicit, smoothed higher-order probability estimate for N-grams with observed count greater that zero, as well as optionally including a modified weighted difference pruning operation.
Figure 4:
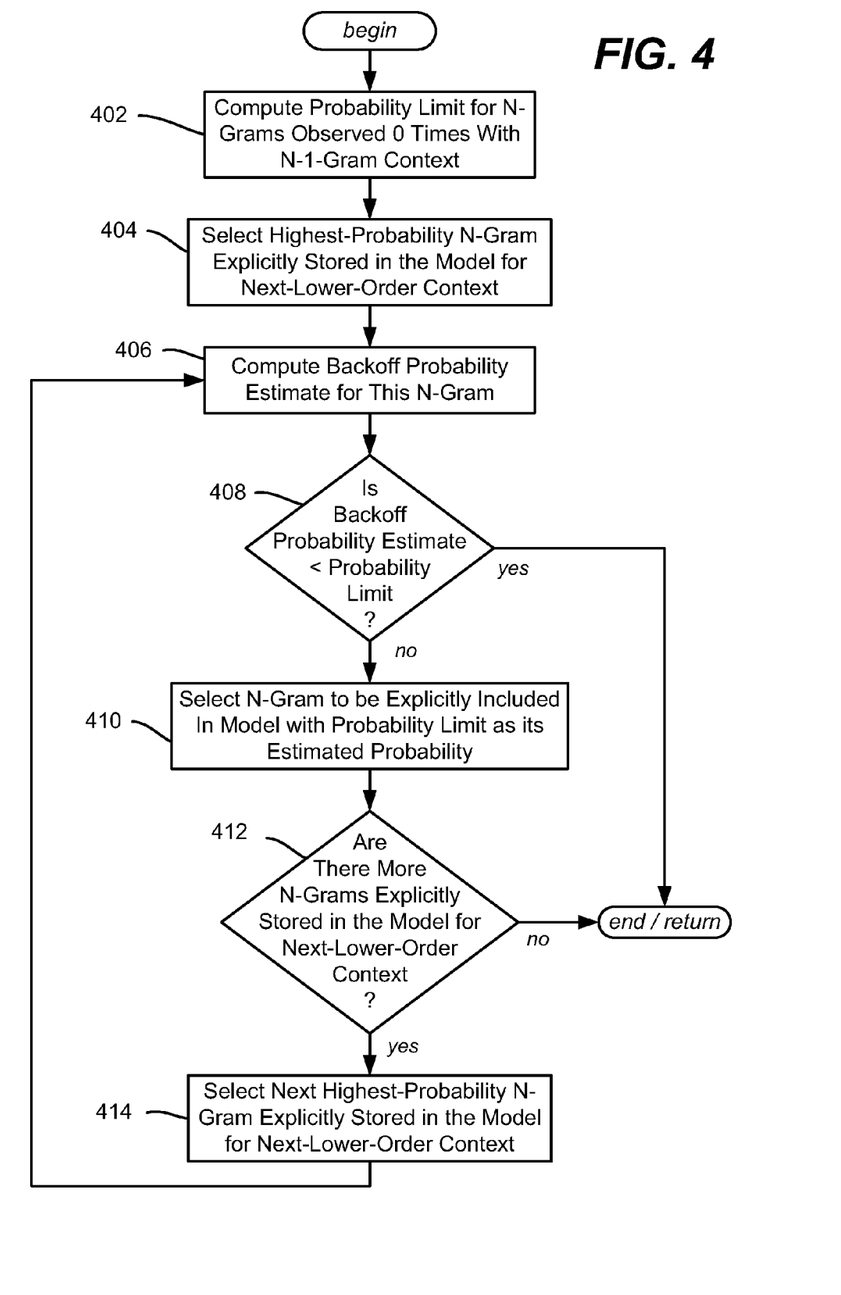
FIG. 4 is a flow diagram showing example steps that may be taken to decide whether to include an explicit higher-order probability estimate for N-grams with observed count equal to zero, and how to estimate such an explicit higher-order probability.

To overcome this complication, the backoff weights are solved for iteratively, as generally represented in the example process steps of FIGS. 2-4. Step 202 selects an N–1-gram context. For each context, an initial value is estimated for the backoff weight, as represented by step 204. The initial value of backoff weight for a context is estimated by computing what the backoff weight would be for the base smoothing method including higher-order probability estimates for all N-grams with that context that are observed in the training corpus. If that value is less than 1.0, it is used as the initial estimate of the backoff weight, otherwise 1.0 is used. As described below, the sum of the probabilities resulting from applying the N-gram selection with that backoff weight is then maintained.

At step 206, the process performs the selection of N-grams for this context that have an observed count greater than zero, and estimates probabilities for those N-grams. Note that additional details of this step are described below with reference to FIG. 3.

More particularly, in FIG. 3 (generally corresponding to step 206 of FIG. 2), step 302 represents selecting an N-gram with observed count greater than zero for the N–1-gram context. Step 304 determines whether there is an explicit next-lower-order estimate for this N-gram in the model. If yes, the process continues to step 306 as described below. If not, then the lower-order N-gram has been pruned, and the process branches to step 320 which repeats for the next observed N-gram and so on, until none remain to be processed.

Step 306 computes the backoff probability estimate for the N-gram, which is the explicit next-lower-order estimate for the N-gram times the backoff weight for the context. Step 308 computes the MLS for the number of observations of the N-gram and the number of observations of the N–1-gram context, as described above.

Step 310 evaluates whether the backoff probability estimate is within the MLS. More particularly, if already within the MLS, the observations training data does not justify including a different higher-order estimate, as described above. Thus, if so, step 310 branches to step 320 to repeat for the next observed N-gram. Otherwise, step 312 is executed to compute the smoothed higher-order probability estimate for the N-gram.

Step 314 is an optional step to determine whether the modified weighted difference of the backoff probability estimate and the smoothed higher-order probability estimate is less than a modified weighted difference pruning (MDP) threshold. Note that this test is automatically performed with respect to the final backoff weight, because the step occurs within the iterative loop of FIG. 2 that selects the final backoff weight. Although the test may be performed for every value of the backoff weight that is tried, only the result for the final backoff weight is saved.

Modified weighted-difference pruning is an additional way to control the size of a model. That is, while the N-gram selection method described here considerably reduces the number of parameters in a high-order language model, the size of the language model may be further reduced (or even reduced without N-gram selection). Note that the concept of significance-based N-gram selection to produce smaller models may be extended by applying less restrictive significance tests to decide when to use a backoff probability estimate in place of an explicit higher-order probability estimate, but this is computationally expensive.

Thus, additional pruning may be performed via a modified version of a known technique referred to as weighted-difference pruning. In weighted-difference pruning, a criterion for using a backoff estimate, in place of an explicit higher-order estimate, is that the inequality:

$$K \times (\log(p(w_n|w_1 \ldots w_{n-1})) - \log(\beta_u p(w_n|w_2 \ldots w_{n-1}))) < \Delta$$

be satisfied, where $\Delta$ is a pruning threshold, K is the Good-Turing-discounted training set count for $w_1 \ldots w_n$, and $\beta_u$ is the backoff weight for the un-pruned model.

Modified weighted-difference pruning uses the following criterion instead:

$$p(w_1 \ldots w_n) \times |\log(p(w_n|w_1 \ldots w_{n-1})) - \log(\beta_p p(w_n|w_2 \ldots w_{n-1}))| < \Delta$$

where $p(w_1 \ldots w_n)$ is an estimate of the probability of $w_1 \ldots w_n$ and $\beta_p$ is the backoff weight for the pruned model.

As can be seen, there are three general modifications to conventional weighted-difference pruning in the modified formula. As one modification, the discounted training set count K of $w_1 \ldots w_n$ is replaced with an estimate the probability of $w_1 \ldots w_n$, computed by chaining the explicit probability estimates, according to the model, for all N-gram lengths up to n. Experiments showed this provided some improvement over discounted training set counts.

Another modification is to use the absolute value of the difference of the log probabilities. Using the signed difference of the log probabilities always prunes a higher-order probability estimate if it is less than the backoff estimate. However, the backoff estimate may be too high, and using the absolute value of the difference avoids this problem. Still another modification is that the difference in log probability is computed with respect to the backoff weight for the pruned model rather than the un-pruned model. Note that if the backoff weight is changed significantly by pruning, backoff estimates that meet the pruning criterion with the old backoff weight may no longer meet the criterion with the new backoff weight, and vice versa. Since the new backoff weight is the one that will be used in the pruned model, that backoff weight is used to make the pruning decisions.

Step 316 determines whether the backoff probability estimate lies between the smoothed higher-order probability estimate and the MLS. More particularly, in some cases the higher-order estimate for $p(w_n|w_1 \ldots w_{n-1})$ may not fall within the MLS for the observed counts, due to smoothing. In such a case, the backoff probability estimate is still preferred if it lies between the smoothed higher-order estimate and the probability range defining the MLS. Note that otherwise the process would reject the backoff estimate for being outside the MLS, only to replace it with a higher-order estimate even further outside the MLS. Step 316 represents checking for this condition, and essentially rejects the higher-order estimate (by branching to step 320) if it is not closer to the MLS than the backoff estimate.

If not between the smoothed higher-order probability estimate and the MLS, step 318 selects the N-gram to be explicitly included in model with its smoothed higher-order probability estimate. Step 320 repeats for other N-grams with observed count>0 for N−1-gram context Returning to FIG. 2, at step 208, the process performs the selection of N-grams for this context that have not been observed, (that is, with an observed count of zero), and estimates probabilities for those N-grams. Note that additional details of this step are described below with reference to FIG. 4.

More particularly, FIG. 4 (generally corresponding to step 208 of FIG. 2) is directed towards the selection/probability estimation for N-grams not observed in the training data (zero-count N-Grams). Step 402 computes a probability limit for N-grams observed zero times for this n−1-gram context, based on the MLS for zero observations of the N-gram given the number of observations of the N−1-gram context. The limit is selected to be the highest probability within this MLS.

Step 404 selects the highest-probability N-gram explicitly stored in the model for the next-lower-order context and step 406 computes the backoff probability estimate for this N-gram.

Note that the backoff probability estimate for N-grams not observed in the training data sometimes falls outside of the corresponding MLS, which in the zero-count (unobserved) case simplifies to:

$$MLS(0, y) = \left\{ p \,\middle|\, 0 \leq p \leq \frac{1}{y+1} \right\}$$

This occurs, for example, when a very high frequency word is part of an unobserved N-Gram. When this happens, as evaluated via step 408, an explicit higher-order estimate $p(w_n|w_1 \ldots w_{n-1})=1/(y+1)$ is included in the model via step 410, which is the upper limit of the MLS. In general, this is a "capping" method for reducing unreasonably high backoff estimates for unobserved N-grams. In order to apply this treatment of zero-count N-grams, the lower-order models are maintained sorted by decreasing probability for a given context. For each higher-order context, to find the zero-count N-grams subject to the $1/(y+1)$ limit, the process traverses the sorted list of explicitly stored N-grams for the backoff context. When an N-gram whose extension to the higher-order context was not observed in the training data is encountered, it is given an explicit probability of $1/(y+1)$, if its weighted backoff probability is greater than that. The traversal stops upon encountering an N-gram for the backoff context that has a weighted backoff probability less than or equal to $1/(y+1)$, which in practice means that only a small number of backoff probabilities are examined for each context.

Steps 412 and 414 repeat the process for N-grams explicitly stored in the model for the next-lower-order context, by selecting the N-gram with the next-highest probability, and so on.

Returning to FIG. 2, for the N−1-gram context, step 210 sums the estimated probabilities for the selected N-grams and the backoff probabilities for all other N-grams. If the probability sum is within a relatively small convergence threshold (e.g., $10^{-6}$) of 1.0 as evaluated at step 212, then that backoff weight is used as the final backoff weight. To this end, step 214 is executed to output the selected N-grams for the context and their estimated probabilities. Step 215 repeats for other N−1-gram contexts.

If the probability sum differs from 1.0 by more than the threshold, and the probability sum exceeds 1.0, the estimated backoff weight is reduced at step 218, and another iteration is performed with the reduced estimated backoff weight. Conversely, if the sum is less than 1.0 by more than the threshold, the estimated weight is increased at step 220, and another iteration performed with the increased estimated backoff weight by returning to step 206 with the adjusted backoff weight, as many times as needed until the probability sum differs from 1.0 by less than the threshold.

As can be readily appreciated, for standard smoothing methods the function relating backoff weights to probability sums is a piece-wise linear function. Within a region where no decision changes about which N-grams to include in the model, the probability sum is a linear function of the backoff weight. At values of the backoff weight where the set of selected N-grams changes, the function may be discontinuous. The linear segments overlap with respect to the probability sum in such a way that there will be one or more values of the backoff weight that make the probability sum equal 1.0, with one specific exception.

More particularly, an exception arises because of the capping of backoff probabilities for unobserved N-grams as described above. It is possible for there to be a context for which all observed N-grams are included in the higher-order model, the probabilities for all unobserved N-grams are either capped at $1/(y+1)$ or effectively zero due to arithmetic underflow, and the probability sum is less than 1.0. For some smoothing methods, the probability sum cannot be increased in this situation by increasing the backoff weight. The process also checks for this situation, and if it arises, the cap on the zero-count probability is increased enough to make the probability sum equal 1.0.

If the first iteration of N-gram selection produces a probability sum less than 1.0, the estimated backoff weight is repeatedly doubled until a sum greater than or equal to 1.0 is obtained, or the exception situation is encountered as described above. If the initial probability sum is greater than 1.0, the process repeatedly halves the estimated backoff weight until a sum less than or equal to 1.0 is obtained. Once there are values for the backoff weight that produce probability sums on both sides of 1.0, a solution is bracketed, and standard numerical search techniques may be used to find that solution.

For example, at each subsequent iteration, a value may be tried for the backoff weight between the largest value tried that produces a sum less than 1.0 and the smallest value tried that produces a sum greater than 1.0. Iterating stops when the sum of the probabilities is within a convergence threshold of 1.0.

A combination of straightforward techniques chooses the next value of the backoff weight to try. One technique is referred to as the "false position method", which basically solves the linear equation defined by the two current bracketing values and corresponding probability sums. The advantage of this method is that, if the bracketing points lie on the same linear segment of the function, a solution is obtained in one step. However, a disadvantage of the method is that it sometimes approaches the solution by a long sequence of tiny steps from the same side. To detect the latter situation, the number of consecutive iterations that make a step in the same direction is tracked. If this number reaches some count, e.g., ten, the next step is taken by the bisection method, which simply tries the value of the backoff weight halfway between the two current bracketing values. In practice, this combined search method works very well, taking an average of less than four iterations per backoff weight.

While the above technology may be used to reduce the size of any N-gram model smoothed with ordinary counts, high-quality results with respect to measured perplexity were obtained via a smoothing technology described in a related patent application entitled "N-Gram Model Smoothing with Independently Controllable Parameters," assigned to the assignee of the present application and hereby incorporated by reference. In general, this provides an interpolated model in which the interpolation weights for the lower-order model are not constrained to match the backoff weights for the lower-order model. This allows the interpolation weights to be set independently of the discounts, with the backoff weights being adjusted to normalize the resulting distributions.

Exemplary Operating Environment

Figure 5:
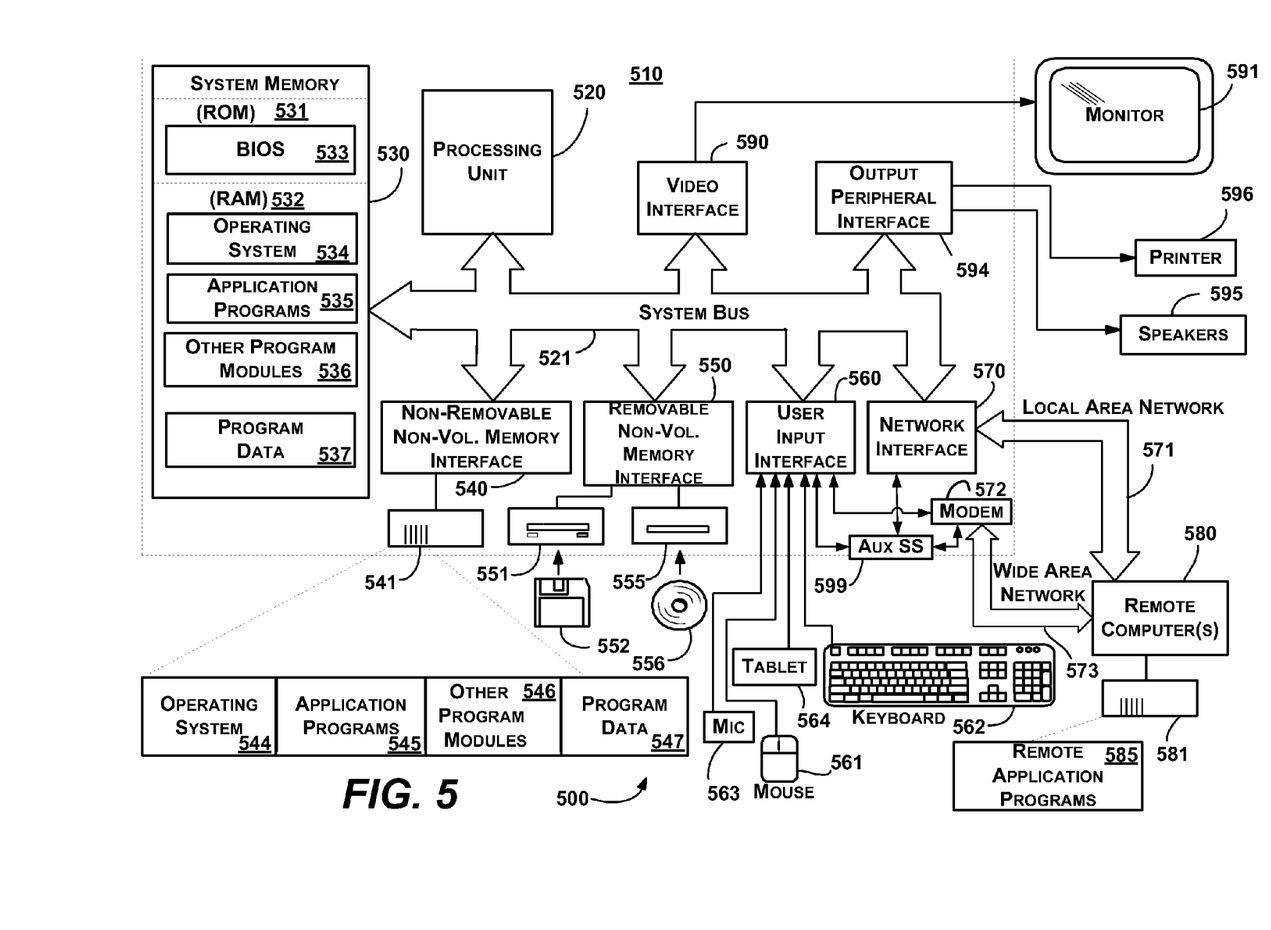
FIG. 5 shows an illustrative example of a computing environment into which various aspects of the present invention may be incorporated.

FIG. 5 illustrates an example of a suitable computing and networking environment 500 on which the examples of FIGS. 1-4 may be implemented. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 5, an exemplary system for implementing various aspects of the invention may include a general purpose computing device in the form of a computer 510. Components of the computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 510 typically includes a variety of computer-readable media. Computer-readable media can be any available media that can be accessed by the computer 510 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 510. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536 and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media, described above and illustrated in FIG. 5, provide storage of computer-readable instructions, data structures, program modules and other data for the computer 510. In FIG. 5, for example, hard disk drive 541 is illustrated as storing operating system 544, application programs 545, other program modules 546 and program data 547. Note that these components can either be the same as or different from operating system 534, application programs 535, other program modules 536, and program data 537. Operating system 544, application programs 545, other program modules 546, and program data 547 are given different numbers herein to illustrate that, at a minimum, they are different copies. A user may enter commands and information into the computer 510 through input devices such as a tablet, or electronic digitizer, 564, a microphone 563, a keyboard 562 and pointing device 561, commonly referred to as mouse, trackball or touch pad. Other input devices not shown in FIG. 5 may include a joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. The monitor 591 may also be integrated with a touch-screen panel or the like. Note that the monitor and/or touch screen panel can be physically coupled to a housing in which the computing device 510 is incorporated, such as in a tablet-type personal computer. In addition, computers such as the computing device 510 may also include other peripheral output devices such as speakers 595 and printer 596, which may be connected through an output peripheral interface 594 or the like.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include one or more local area networks (LAN) 571 and one or more wide area networks (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560 or other appropriate mechanism. A wireless networking component such as comprising an interface and antenna may be coupled through a suitable device such as an access point or peer computer to a WAN or LAN. In a networked environment, program modules depicted relative to the computer 510, or portions thereof, may be stored in the remote memory storage device. By way of example, and not limitation, FIG. 5 illustrates remote application programs 585 as residing on memory device 581. It may be appreciated that the network connections shown are exemplary and other means of establishing a communications link between the computers may be used.

An auxiliary subsystem 599 (e.g., for auxiliary display of content) may be connected via the user interface 560 to allow data such as program content, system status and event notifications to be provided to the user, even if the main portions of the computer system are in a low power state. The auxiliary subsystem 599 may be connected to the modem 572 and/or network interface 570 to allow communication between these systems while the main processing unit 520 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a computer-implemented method performed on at least one processor, comprising: processing training data to train an N-gram model, including excluding a higher-order probability estimate for an N-gram in the model when a backoff probability estimate for the N-gram is within a maximum likelihood set determined by that N-gram and the N-gram's associated context.

2. The computer-implemented method of claim 1 further comprising, determining the backoff probability estimate by iteratively adjusting a backoff weight until a probability mass is within a threshold of a desired value, and using the estimated backoff weight in computing the backoff probability estimate.

3. The computer-implemented method of claim 2 further comprising estimating an initial backoff weight based upon including a higher-order probability estimate for observed N-grams in the training data.

4. The computer-implemented method of claim 2 further comprising, performing N-gram selection to obtain probability values for summing into the probability mass.

5. The computer-implemented method of claim 2 wherein adjusting the backoff weight comprises selecting a new backoff weight by a false position method, or selecting a new backoff weight by a bisection method, or selecting a new backoff weight by a false position method and by a bisection method.

6. The computer-implemented method of claim 5 further comprising, performing the false position method to make adjustments to select new backoff weights over a plurality of iterations, tracking consecutive iterations that make an adjustment in a same direction, and if the consecutive iterations that make an adjustment in the same direction exceeds a count, performing the bisection method to select a new backoff weight for the next iteration.

7. The computer-implemented method of claim 1 wherein the backoff probability estimate is not within the maximum likelihood set, and further comprising, determining whether the backoff probability estimate is between the maximum likelihood set and the higher-order probability estimate, and if so, excluding the higher-order probability estimate from the model.

8. The computer-implemented method of claim 1 wherein the backoff probability estimate is not within the maximum likelihood set, and further comprising, determining whether the N-gram has been observed in the training data, and if so, including the higher-order probability estimate in the model.

9. The computer-implemented method of claim 1 further comprising, determining whether the N-gram has been observed in the training data, and if not, determining whether the backoff probability estimate exceeds a limit corresponding to the maximum likelihood set, and if the limit is exceeded, including a capped higher-order probability estimate, based upon the limit, in the model.

10. The computer-implemented method of claim 9 further comprising, determining the backoff probability estimate by iteratively adjusting a backoff weight to increase a probability mass, and increasing the limit if the probability mass cannot be increased by adjusting the backoff weight.

11. The computer-implemented method of claim 1 wherein processing the training data to train the N-gram model further comprises performing additional pruning.

12. The computer-implemented method of claim 11 wherein performing the additional pruning comprises determining whether to include a higher-order estimated probability in a model for a given N-gram, including computing a backoff weight, obtaining a difference value corresponding to a difference between a first value representative of a lower-order estimated probability minus a second value representative of the higher-order estimated probability times the backoff weight, comparing the difference value against a pruning threshold, and including the higher-order estimated probability or pruning higher-order estimated probability based on whether the threshold is met.

13. The computer-implemented method of claim 11 wherein performing the additional pruning comprises performing modified weighted difference pruning, including using an estimate of the probability of an N-gram computed by chaining explicit probability estimates for N-gram lengths, using an absolute value of a difference of the log probabilities, or computing the difference in log probability with respect to a final backoff weight for the model, or any combination of using an estimate of the probability of an N-gram computed by chaining explicit probability estimates for N-gram lengths, using an absolute value of a difference of the log probabilities, or computing the difference in log probability with respect to a final backoff weight for the model.

14. In a computing environment, a system comprising: a memory coupled to a bus system, wherein the memory comprises computer useable program code; one or more processing units, wherein the one or more processing units execute the computer useable program code to implement a training mechanism configured to train an N-gram language model by processing training data into lower-order models relative to the N-gram language model, including using each lower-order model to train a next-higher order model until the N-gram language model is trained, the training mechanism including an N-gram selection process that is configured to evaluate, for each N-gram, whether a backoff probability estimate is within a maximum likelihood set determined by that N-gram and the N-gram's associated context, and if so, to exclude the N-gram from the language model.

15. The system of claim 14 further comprising, a modified weighted difference pruning mechanism that excludes N-grams from the language model based upon an estimate of the probability of an N-gram computed by chaining explicit probability estimates for N-gram lengths, an absolute value of a difference of the log probabilities, or a difference in log probability with respect to a final backoff weight for the model, or any combination of an estimate of the probability of an N-gram computed by chaining explicit probability estimates for N-gram lengths, an absolute value of a difference of the log probabilities, or the difference in log probability with respect to a final backoff weight for the model.

16. The system of claim 14 further comprising, a mechanism that obtains the backoff probability estimate by iterating to adjust a backoff weight until a probability mass corresponding to that backoff weight is within a threshold of a desired value.

17. One or more computer storage devices having computer-executable instructions, which when executed perform steps, comprising: determining whether to include a higher-order estimated probability in a model for a given N-gram, including computing a final backoff weight, obtaining a difference value corresponding to a difference between a first value representative of a lower-order estimated probability minus a second value representative of the higher-order estimated probability times the final backoff weight, comparing the difference value against a pruning threshold, and including the higher-order estimated probability or pruning higher-order estimated probability based on whether the threshold is met.

18. The one or more computer storage devices media of claim 17 wherein the difference value is an absolute value of the difference.

19. The one or more computer storage devices of claim 17 wherein the first value is a log of the lower-order estimated probability and the second value is a log of the higher-order estimated probability times the final backoff weight.

20. The one or more computer storage devices of claim 17 wherein obtaining the difference value comprises multiplying the difference by a constant computed by chaining probability estimates for N-grams lengths.

* * * * *